Dec. 4, 1951  C. H. TRAVER  2,577,639
METERING VALVE
Filed April 25, 1947  2 SHEETS—SHEET 1

INVENTOR.
Clarence H. Traver
BY Harrell F. Wheeler

Dec. 4, 1951  C. H. TRAVER  2,577,639
METERING VALVE
Filed April 25, 1947  2 SHEETS—SHEET 2
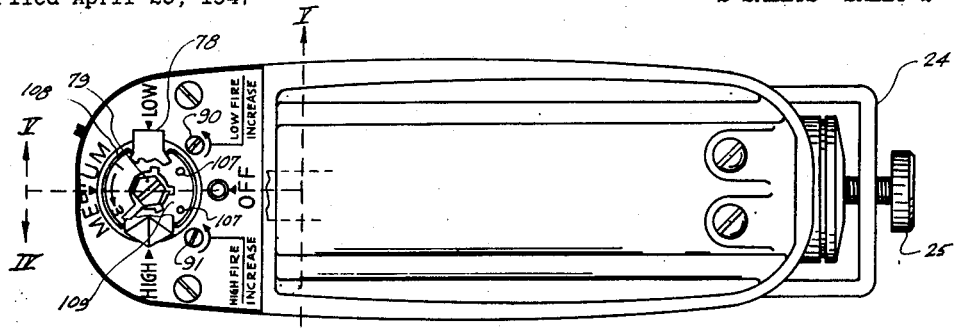
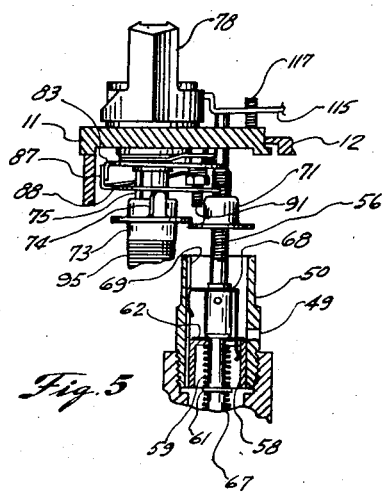
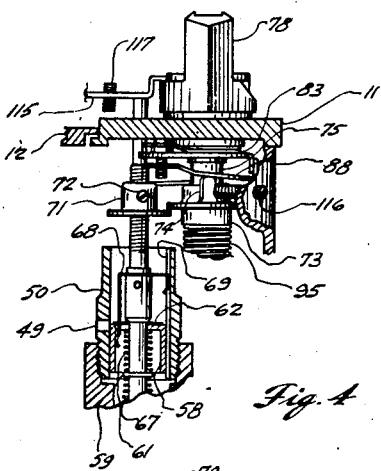
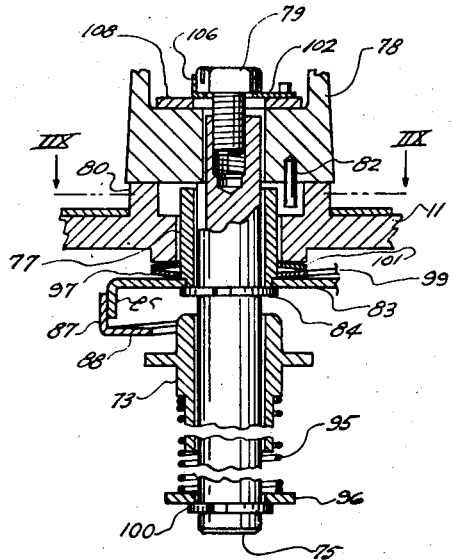
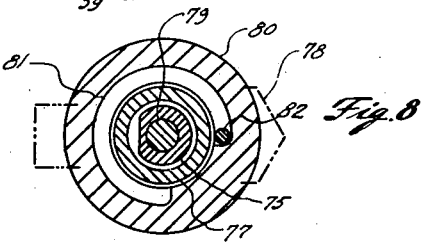
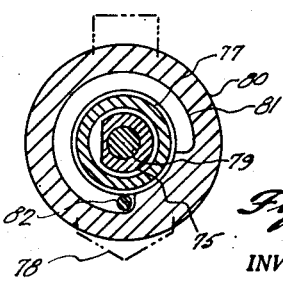
INVENTOR.
Clarence H. Traver
BY Patented Dec. 4, 1951

2,577,639

UNITED STATES PATENT OFFICE 2,577,639

METERING VALVE

Clarence H. Traver, Milwaukee, Wis.

Application April 25, 1947, Serial No. 743,817

6 Claims. (Cl. 137—21)

This invention relates generally to the solving of problems attendant upon the control of fuel supply to liquid fuel burners of a type requiring measured quantities of fuel, and the rate of feed must be adjustable not only to change from high to low fire, but also to compensate for differing and variable fuel viscosities.

In burners of the character mentioned, it is usually desirable to maintain a small pilot flame during the time when heat is not required in the space being heated in order to make re-lighting the burner unnecessary. The oil metering valve must therefore be capable of accurately metering the oil to the burner while passing a relatively large flow which provides "high fire" in the burner, or when adjusted to pass a very minute flow for providing a pilot flame or "low fire" in the burner.

It is customary to provide liquid level controls of the type referred to above with a suitable attachment, responsive to the temperature of a space to be heated, which controls the meter and adjusts it to a different setting for flow of liquid fuel to the burner in proportion to the temperature variations of the space being heated.

Since the volume of a fluid fuel, such as oil under constant pressure, which will flow through an orifice of a given size within a given period of time, varies inversely with the viscosity of the oil, it is desirable to provide a means within fluid fuel controls of the type above referred to which compensates for the effects of at least some of the factors which produce variations in the viscosity of the fluid fuel.

The principal object of this invention is to provide an accurately adjustable valve device for metering purposes and at the same time provide mechanism that is subject to reasonable production processes and cost.

Further objects of this invention are: to provide a liquid fuel control having means for automatic adjustment to compensate for variations in viscosity of fuel due to temperature changes, with means for manual adjustment to compensate for differing grades or viscosities of liquid fuel; to provide a liquid fuel control utilizing a ported valve body and a metering valve member therein having a construction providing accurate and oil tight relation of the valve member to the port without necessitating a close fit between the valve member and the valve body; to provide a metering valve having simple and effective adjustable cam means for manually positioning a valve member relative to a port; to provide cam means for manually positioning a valve member relative to a valve port wherein portions of the cam means may be independently adjusted to provide suitable high and low fire positions of the valve; and to provide a control for liquid fuel having means for locking a temperature responsive attachment automatically upon manual movement of a metering valve to closed position whereby to prevent movement of the valve in response to temperature changes.

The invention will be better understood upon reference to the following description and accompanying drawings, in which Fig. 1 is a top view of the fuel control with top cover removed and portions broken away to better show the construction;

Fig. 4 is a sectional view of a portion of the fuel control case and the metering valve taken generally along the line IV—IV of Fig. 7, but showing in elevation the position of certain parts when the manual control is in the "low fire" position;

Fig. 5 is a view of a portion of the fuel control taken generally along the line V—V of Fig. 7, showing in elevation the position of certain parts when the manual control is in the "high fire" position;

Fig. 6 is an enlarged sectional view of the fuel viscosity adjustment means taken generally along the line V—V of Fig. 7, showing the manual control in the "off" position;

Fig. 7 is a top view of the fuel control with the cover in place and with a portion of the manual control broken away to better show the fuel viscosity adjustment means;

Fig. 8 is a sectional view taken generally along the line VIII—VIII of Fig. 6, showing the manual control in "off" position;

Fig. 9 is a view similar to Fig. 8, but showing the manual control in "high" position.

Figure 1:
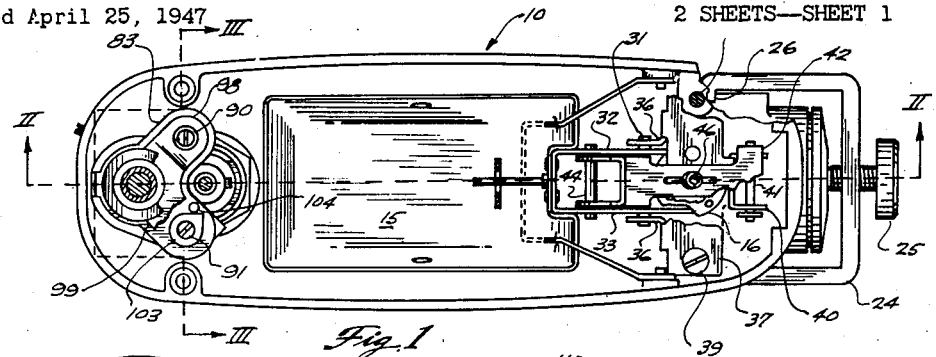
Figure 2:
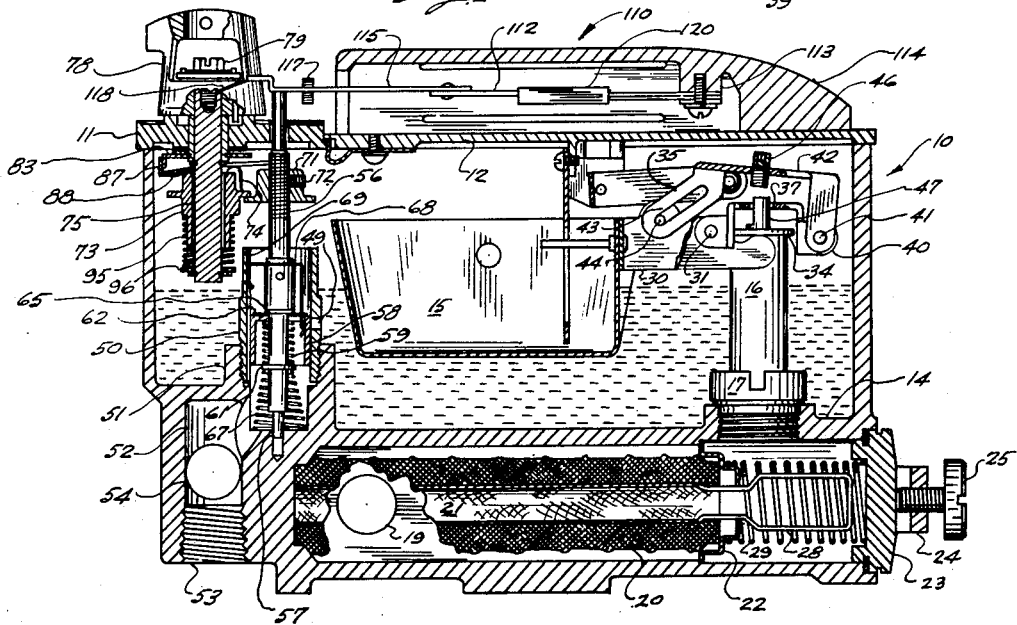
Fig. 2 is a sectional view taken generally along the line II—II of Fig. 1.

Referring now to Figs. 1 and 2, reference character 10 indicates generally a fuel control valve casing having two separately removable covers 11 and 12. Casing 10 is divided into a strainer chamber and a constant level chamber by a horizontal partition 14. A float 15 is located within the constant level chamber and serves to position an inlet valve 16 which controls the flow of oil through a valve port (not shown) which is formed in a fitting 17 screwed into the partition 14. The inlet valve construction and the lever arrangement, whereby the float 15 maintains a constant oil level within the chamber, are disclosed and claimed in a patent to H. E. Malone, 2,400,560, issued May 21, 1946, but are briefly described below.

Oil flows into the filter chamber through an inlet passage 19, through a filter 20 formed of a layer of fibrous material surrounding a central tube of wire mesh 21, and through an opening in a filter retainer cap 22 to the inlet port of the constant level chamber formed in fitting 17. The strainer chamber is closed by means of a plug 23 held in place by a U-shaped clamp 24 and thumb screw 25. The legs of the clamp have inwardly bent ends 26 which extend into depressions in the outer surface of casing 10, as may best be seen in Fig. 1. A filter handle 28 is secured to the central wire mesh tube 21, allowing easy removal of the filter, and a compression spring 29 is positioned in a recess in the inner face of plug 23, serving to hold a filter retainer cap 22 in place.

The float 15 is an open topped pan and is attached to a float lever 30 which is pivoted to a pivot pin 31. As shown in Fig. 1, the float lever 30 consists of spaced apart members 32 and 33, these members extending on opposite sides of the inlet valve and engaging the under surface of flange 34 in the valve member 16. The pivot pin 31 is carried by bracket members 36 which are formed on a cross piece 37 which extends from side to side of the casing 10, and which is secured in place by screws 39 which fit into bosses formed in the casing side walls. The cross piece 37 is also formed to provide a bracket 40 which receives a pivot pin 41. This pivot pin 41 carries a safety cut-off lever 42 which overlies the inlet valve assembly and which is provided with a slot 43 receiving a pivot pin 44 carried by members 32 and 33 of the float lever. The cut-off lever 42 is provided with an adjustable screw 46 which is adapted to engage an extension 47 of the inlet valve stem if the pan sinks, and will positively close the valve and support the pan before the pan strikes the partition 14. This screw 46 is adjusted so that a slight space is present between it and the extension 47 when the float 15 is in the position corresponding to normal oil level.

In operation the parts normally assume the positions shown in Fig. 2. The weight of the inlet valve assembly is sufficient to close the valve port in fitting 17 and prevent entry of oil into the float chamber, this weight serving to bias the valve closed. When the oil level drops slightly from the desired level the float 15 lowers, thus moving float lever 30 counter-clockwise about its pivot 31, thereby raising the inlet valve assembly from its seat and permitting oil to flow to the float chamber. As the oil level rises the float 15 rises accordingly, thus permitting the valve assembly to progressively close and finally shut off the flow of oil. In this manner the float serves to maintain a substantially constant oil level in the chamber.

An outlet for the constant level chamber is provided by a port 49 in a cylindrical valve body 50 screwed into a boss 51 formed in the base of casing 10. Oil passage 52 connects with the central oil passage through the valve body 50 and terminates in a threaded outlet connection 53 to which may be connected a pipe for conducting the oil to the burner. An alternate outlet opening 54 is provided which may be used on installations where the lower outlet is inaccessible.

Figure 10:
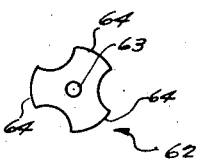
Fig. 10 is an enlarged top view of an oil temperature responsive member shown in Fig. 2.

A reciprocable valve member or stem 56 extends centrally through the valve body 50 and has a lower reduced portion 57 extending into a hole in the valve casing 10, this serving to hold lower end of stem 56 in place laterally. The upper end of stem 56 extends through an opening in cover 11. A port-obstructing portion is provided by a sleeve 58 fitted relatively loosely within tubular valve body 50 and having a hole through its upper closed end through which stem 56 loosely extends. A compression spring 59, having one end abutting the central portion of the inner surface of the closed end of sleeve 58 and the other end abutting a shoulder 61 formed on stem 56, resiliently urges the sleeve 58 against a temperature responsive member 62. Member 62 is formed of temperature responsive bimetal (Fig. 10) and has a central opening 63, through which stem 56 loosely extends, and lobes 64 which extend generally horizontally over sleeve 58. A shoulder 65 on stem 56 serves to hold member 63 in place. Bimetal member 62 has its slow expanding metal adjacent the sleeve 58 and therefore assumes a slightly cupped shape, the extremities of its lobes 64 moving downward upon a drop in temperature of the bimetal. Member 62 may be so formed that at ordinary room temperature, for example, 70° F., it has a slightly cupped shape, at a temperature of 120° F. it is flat, and at temperatures below 70° F. assumes a progressively more cupped shape. A second compression spring 67 bottomed on the base of boss 51 and abutting shoulder 61, serves to longitudinally urge stem 56 and sleeve 58 into flow-obstructing relationship with port 49.

A generally U-shaped resilient spring member or strip 68 is secured at its base to stem 56 and has one leg extending into and slidable within a longitudinal groove 69 formed in the wall of valve body 50. The other leg of member 68 extends downwardly through an opening in the closed end of sleeve 58 and abuts the inner surface of the side wall of sleeve 58, which is adjacent the port 49, thereby urging sleeve 58 against the side wall of the valve body 50.

From the foregoing it will be apparent that sleeve 58 is longitudinally urged into flow obstructing relationship with port 49 by compression spring 67 and is laterally urged into flow-obstructing relationship with respect to port 49 by resilient member 68. If stem 56 and consequently sleeve 58 are moved downwardly within valve body 50 so as to uncover a part or all of port 49, oil will flow therethrough over bimetal member 62, through openings in the top of sleeve 58, and through outlet 52 to the burner. If the oil flowing through port 49 is at a relatively low temperature, and thus of relatively high viscosity, bimetal member 62 will assume a cupped shape, thereby moving sleeve 58 downwardly on stem 56 a slight distance in opposition to the biasing force of compression spring 59. As a result, for a given downward movement of stem 56 a greater portion of port 49 will be uncovered, thereby compensating for the increased viscosity of the oil due to oil temperature. Upon an increase in oil temperature up to 120° F. movement of bimetal member 62 in the reverse direction will allow spring 59 to position sleeve 58 relatively further upward on stem 56, thereby uncovering a smaller portion of port 49 for a given downward movement of stem 56, thus compensating for the decreased viscosity of the oil at the higher temperature.

A manual means and a temperature responsive means for actuating stem 56 will now be described. A flanged member 71 is turned onto a threaded portion of stem 56 and locked in position by the set screw 72. Member 71 is positioned on stem 56 to allow the flanged portion thereof to contact a similar flange on a cam follower member 73 so that stem 56 and its flanged member 71 may be moved downwardly against spring pressure of spring 67 under the urge of flanged member 73.

Formed on the flanged portion of member 73 is an upwardly extending piece 74, the upper surface of which "rides" the under side of a cam hereinafter described. Member 73 has a central D-shaped opening therein through which a D-shaped shaft 75 slidably and non-rotatably extends. Shaft 75 extends through a bushing 77 (Fig. 6) secured to cover 11 and has a knob 78 attached to its end by means of screw 79 which is turned into a threaded axial hole in the shaft 75. As may be best seen in Figs. 6, 8, and 9, the bottom surface of knob 78 abuts an upwardly extending annular rib 80 on cover 11 cooperating with bushing 77 to form an arcuate slot 81 concentric with shaft 75. The slot 81 acts as a guide for a downwardly extending pin 82 secured to knob 78. The ends of slot 81 serve as stops to limit the range of rotation of knob 78. As may best be seen in Fig. 6 a reduced portion of bushing 77 extends through a cam plate 83 formed of relatively stiff sheet metal, the plate 83 being rigidly and non-rotatably secured on bushing 77. A stop washer 84 supports the bushing 77 and its assembled parts, since the washer is tightened into a circumferential groove in shaft 75 (Fig. 6).

Figure 3:
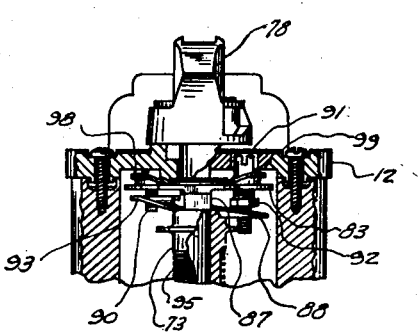
Fig. 3 is a sectional view of a portion of the fuel control taken generally along line III—III of Fig. 1, having portions broken away to better show the position of certain parts when the manual control is in the "off" position.

Cam plate 83 has a depending tab 85 to which is secured by any suitable means, such as welding, an upwardly extending tab 87 formed on a cam track 88 centrally of its length adjustment and support for each end of cam track 88 is provided by flanged screws 90 and 91 (Fig. 3). Screw 91 passes through plate 83 and is threaded into cam 88. It therefore extends loosely through an externally threaded bushing 92. The bushing is threaded into cam plate 83 and thus provides a guide for the screw 91, the flange of which screw rests against the upper face of plate 83 or against the bushing end, in case the bushing is threaded upwardly so as to extend above the plate.

Screw 90 extends loosely through plate 83, with the screw flange bearing on the upper side of the plate, and is threaded into offset tab 93 forming part of the upper end of cam 88.

The heads of screws 90 and 91 are accessible through holes in cover 11. Adjustment of screw 91 positions the lower extremity of cam track 88 relative to the cam plate 83, and therefore determines the degree to which the cam follower 73—74 (and the metering valve 58) will be thrust downwardly for "high fire" when this portion of the cam is brought to bear against the cam follower. Adjustment of the bushing 92 provides a fine adjustment of this position.

Adjustment of screw 90 serves to position the high extremity (low fire) of cam track 88. The rigid support in the mid-portion of cam track 88 afforded by tabs 87 and 85 allows the two extremities of cam track 88 to be adjusted independently. With the high extremity and low extremity of cam track 88 properly adjusted, it will be noted that track 88 assumes a generally helical shape surrounding shaft 75. A compression spring 95 bottomed on a washer 96 held in place on the lower end of shaft 75 by a stop washer 100 abuts a shoulder on cam follower member 73 and serves to urge member 73 into its extreme upward position, which is established by contact of piece 74 with the inner margin of helical cam track 88.

As may best be seen in Figs. 1, 3, and 6, a spring washer 97 is mounted on sleeve 58 and has two extending portions 98 and 99 through which the heads of screws 90 and 91 extend. The ends of extending portions 98 and 99 are bent upwardly, thereby exerting a frictional force on the flanges of screws 90 and 91 to resist turning thereof, and to press the screws 90 and 91 against cam plate 83, thus insuring adjustment of the high and low extremities of cam track 88.

A second spring washer 101 (Fig. 6) is mounted on sleeve 77 adjacent spring washer 97 and serves to urge shaft 75, cam plate 83, and cam track 88 downwardly a distance limited by the engagement of the bottom surface of the head of screw 79 with a washer 102 which overlies the base of knob 78.

Turning screw 79 further out of shaft 75 allows spring washer 97 to flex somewhat and to move the cam assembly downward a slight distance relative to port 49. This slight downward movement positions sleeve 58 so as to uncover relatively more of the port. Adjustment of screw 79 therefore may be utilized as a means for adjusting sleeve 58 relative to port 49 to permit the valve to properly meter fuel oil of differing grades or viscosities.

With knob 78 turned to the "off" position (Figs. 2 and 3) as established by suitable marking on cover 11, as shown in Fig. 7, it will be noted that piece 74 is in contact with the high extremity of cam track 88 and stem 56 therefore assumes the position shown in Fig. 2. While stem 56 is in this position, sleeve 58 completely covers port 49 and no oil flows to outlet 52.

Manual movement of knob 78 to its "low" position, as shown in Fig. 4, results in piece 74 moving down a relatively steeply sloping section of cam 88 and onto a more gently sloping portion. The resulting downward displacement of follower 73 and stem 56 results in a downward movement of sleeve 58, which uncovers a small portion of port 49, allowing oil to flow to outlet 52 at a relatively slow rate. Further manual movement of knob 78 to its "high" position, as shown in Fig. 5, moves piece 74 further down the sloping section of cam track 88. The corresponding downward movement of stem 56 positions sleeve 58 so as to uncover a larger portion of port 49, allowing oil to flow therethrough at a relatively more rapid rate.

It will be noted that adjustment of screw 91 establishes the position sleeve 58 will assume relative to port 49 when knob 78 is in "high" position. When the "high fire" point or position of screw 91 permitting the desirable maximum rate of flow through port 49 is established, a flange or stop washer 103 (Fig. 1) non-rotatably secured to the head of screw 91 is adjacent the upwardly extending stop 104 mounted on cam plate 83. The same adjustment of screw 91 to its stop at the extreme of its rotation in the opposite direction may be followed in establishing the desirable minimum rate of oil flow of high adjustment of the burner.

Similarly screw 90 is provided with a stop to interact with its flange and to facilitate adjustment of the low fire setting of the cam 88.

In calibrating the valve for fuels of standard viscosity, manual means for such viscosity adjustment is provided by screw 79 which is adjusted to permit the valve to correctly meter the heaviest or most viscous oil to be used as fuel. Washer 102 is then slipped onto the head of screw 79 and a tab 106 formed on washer 102 is bent upwardly against the side of the hexagonal head of screw 79, thereby non-rotatably securing washer 102 thereto (Fig. 6). Two upwardly extending stops 107 (Fig. 7) mounted on washer 108 cooperate with an extending portion 109 of washer 102 to limit the range of adjustment of screw 79. Suitable markings may be placed adjacent screw 79 to indicate that it is to be rotated counterclockwise to permit the valve to correctly meter fuel oil of relatively higher viscosity.

Numeral 110 in Fig. 2 designates generally a space temperature responsive means comprising a bimetal element 112 mounted on a downwardly extending boss 113 on the top of a case 114 which may be attached by any suitable means to cover 12. An extension 115 of bimetal 112 extends through a slot in case 114 and extends over the end of stem 56. An adjustable stop 117 is threaded through a hole in extension 115 and limits downward movement thereof by contacting cover 11. An upwardly off-set portion of the extension contacts an upwardly sloping ridge or cam section 118 in the knob 78 (Fig. 2). Ridge 118 is so located on knob 78 that when knob 78 is in its "off" position, extension 115 is held in a position which does not permit it to exert a downward pressure on stem 56. If the knob 78 is moved to its low position, bimetal 112 may control the positioning of stem 56 in response to temperature variations in the space to be heated. Screw 116 (Fig. 4) extends through a tapped hole in case 10 and may be moved into stop relationship with piece 74 to prevent moving of knob 78 beyond its "low" position when bimetal controlled actuation of the valve is desired. As illustrated, the space to be heated may be at a location remote from bimetal 112 since a heater 120 (Fig. 2) may be so connected to a room thermostat (not shown) as to generate heat, moving bimetal 112 downwardly when the room thermostat closes its contacts.

Various modifications coming within the spirit of the invention may suggest themselves to those skilled in the art, and hence the invention is not to be limited to the specific form shown except to the extent indicated in the appended claims.

What is claimed is:

1. A valve comprising a valve body having a port, means controlling flow through said port, said means comprising a reciprocable valve stem positionable within said body, a sleeve resiliently held on said stem and movable therewith, said sleeve being loosely fitted within said body and movable laterally and longitudinally into flow-obstructing relationship with said port for varying the flow therethrough, a longitudinal groove in said body, a generally U-shaped resilient member mounted on said stem having one leg abutting said sleeve and the other leg positioned within said groove for resiliently urging said sleeve laterally into flow-obstructing relation with said port, and means cooperating with said stem for longitudinally positioning said stem thereby longitudinally positioning said member in flow-obstructing relationship with said port.

2. A valve controlling the flow of fluid fuel comprising a valve body having a port, means controlling the fuel flow through said port, said means comprising a reciprocable valve stem having a flow-obstructing element mounted thereon and movable into a flow-obstructing relationship with said port, said element being capable of limited longitudinal movement relative to said stem, biasing means biasing said element toward one limit of said longitudinal movement, a fuel temperature responsive member mounted on said stem in the path of flow of said fuel and abutting said element, said member adapted to move said element longitudinally relative to said stem in opposition to the biasing force of said biasing means thereby positioning said element upon said stem in response to fuel temperature changes, and means cooperating with said stem to move said element into flow-obstructing relationship with said port.

3. A valve for controlling the flow of fluid fuel comprising a valve body having a port, means controlling the fuel flow through said port, said means comprising a reciprocable valve stem having a flow-obstructing element mounted thereon and movable into a flow-obstructing relationship with said port, said element being capable of limited longitudinal movement relative to said stem, biasing means biasing said element toward one limit of said longitudinal movement, a fuel temperature responsive member mounted on said stem in the path of flow of said fuel and abutting said element, said member adapted to move said element longitudinally relative to said stem in opposition to the biasing force of said biasing means thereby positioning said element upon said stem in response to fuel temperature changes, resilient means abutting said body and said element for laterally urging said element into flow-obstructing relationship with said port and means cooperating with said stem to longitudinally move said element into flow-obstructing relationship with said port.

4. A valve for controlling the flow of fluid fuel comprising a valve body having a port, means controlling the fuel flow through said port, said means comprising a reciprocable valve stem having a flow-obstructing element mounted thereon and movable into a flow-obstructing relationship with said port, said element being capable of limited longitudinal movement relative to said stem, biasing means biasing said element toward one limit of said longitudinal movement, a fuel temperature responsive member mounted on said stem in the path of flow of said fuel and abutting said element, said member adapted to move said element longitudinally relative to said stem in opposition to the biasing force of said biasing means thereby positioning said element upon said stem in response to fuel temperature changes, and means cooperating with said element for longitudinal positioning thereof in flow-obstructing relationship with said port, said last named means comprising a cam track supported adjacent said body, the position of portions of said cam track relative to said port being manually adjustable, and a cam follower mounted adjacent said cam track and manually movable over the contour thereof, said follower having operative connection with said element for longitudinally positioning the same in flow obstructing relationship with said port in response to the contour of said cam.

5. A valve controlling the flow of fluid fuel comprising a valve body having a port, means controlling the fuel flow through said port, said means comprising a reciprocable valve stem having a flow-obstructing element mounted thereon and movable into a flow-obstructing relationship with said port, said element being capable of limited longitudinal movement relative to said stem, biasing means biasing said element toward one limit of said longitudinal movement, a fuel temperature responsive member mounted on said stem in the path of flow of said fuel and abutting said element, said member adapted to move said element longitudinally relative to said stem in opposition to the biasing force of said biasing means thereby positioning said element upon said stem in response to fuel temperature changes, and means cooperating with said element for longitudinal positioning thereof in flow-obstructing relationship with said port, said last named means comprising a cam track supported adjacent said body, the position of portions of said cam track relative to said port being manually adjustable, and a cam follower mounted adjacent said cam track and manually movable over the contour thereof, said follower having operative connection with said element for longitudinally positioning the same in flow-obstructing relationship with said port in response to the contour of said cam, and means for manually moving said follower to position said element independently of said cam thereby compensating the action of said positioning means to permit said fuel control valve to accommodate fuels of differing viscosities.

6. A valve body having a bore, a wall of which is ported for fluid passage, a port controlling member of lesser diameter than the bore for reciprocation therein, a reciprocable valve stem positionable within said bore and carrying said sleeve, a longitudinal groove in said bore, and means for causing the member to resiliently bear against the wall of the bore adjacent the port, said means comprising a generally U-shaped resilient member mounted on said stem having one leg abutting said member and the other leg positioned within the groove for alignment of the member against the ported portion of the wall.

CLARENCE H. TRAVER.

REFERENCES CITED

The following references are of record in the file of this patent:

UNITED STATES PATENTS

| Number | Name | Date |
| --- | --- | --- |
| 601,923 | Williams | Apr. 5, 1898 |
| 948,405 | Webb | Feb. 8, 1910 |
| 1,901,649 | Huber | Mar. 14, 1933 |
| 2,076,306 | Weeks | Apr. 6, 1937 |
| 2,274,145 | Johnson | Feb. 24, 1942 |
| 2,301,041 | Hann | Nov. 3, 1942 |
| 2,317,063 | Johnson | Apr. 20, 1943 |
| 2,358,040 | Williams | Sept. 12, 1944 |
| 2,369,739 | Johnson | Feb. 20, 1945 |

FOREIGN PATENTS

| Number | Country | Date |
| --- | --- | --- |
| 50,345 | Sweden | Nov. 16, 1921 |
| 103,279 | Switzerland | Feb. 1, 1924 |